No. 737,245. Patented August 25, 1903.

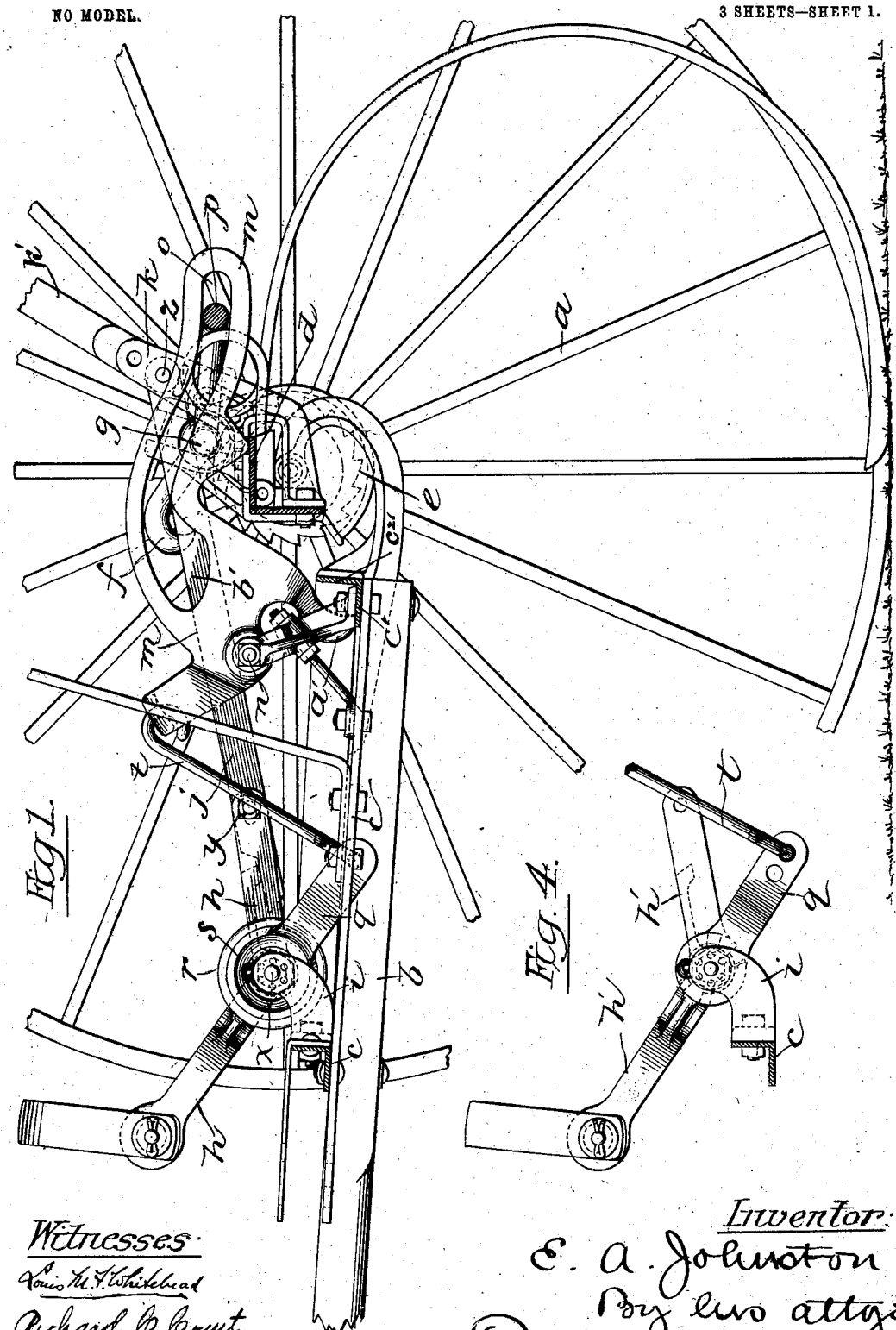

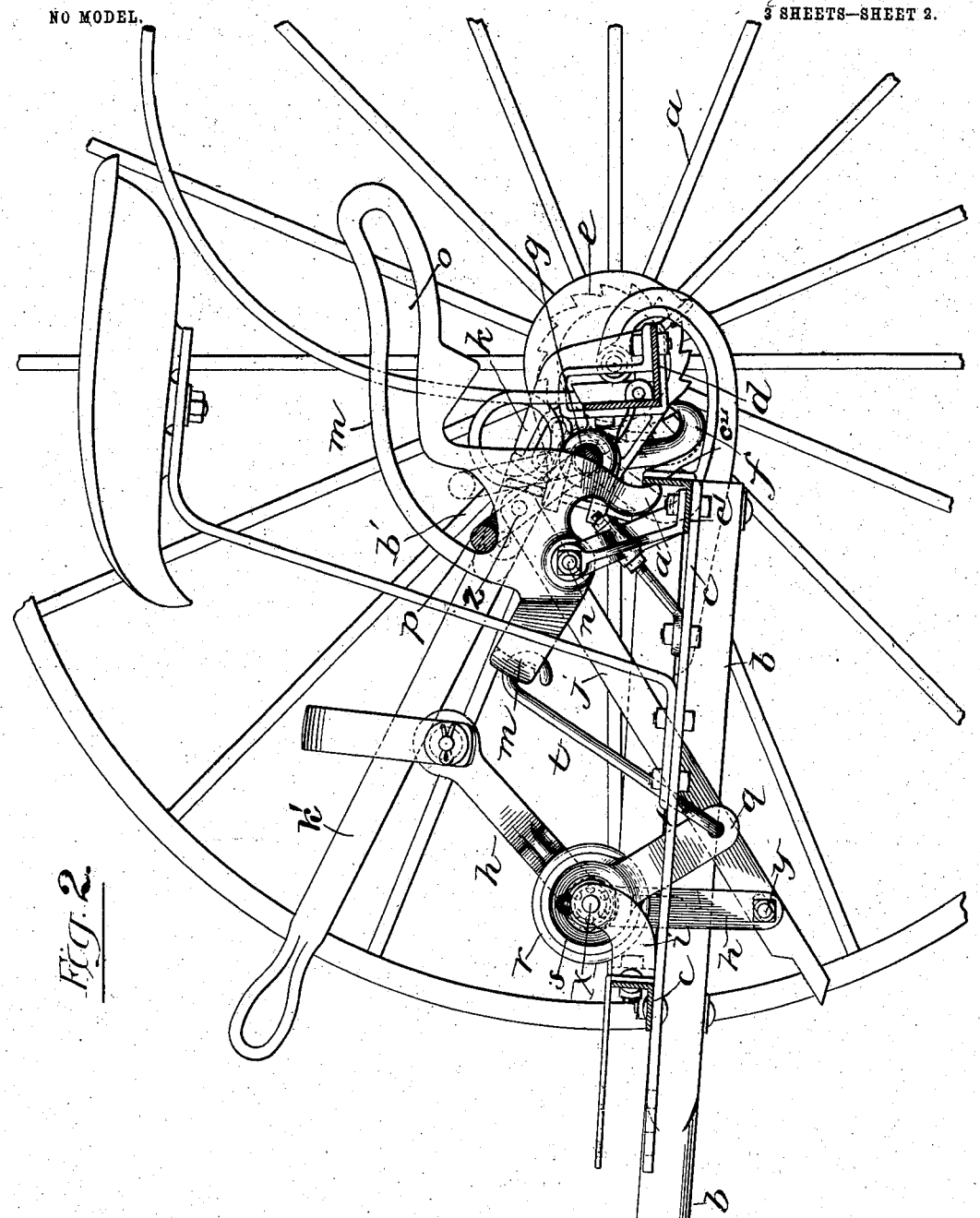

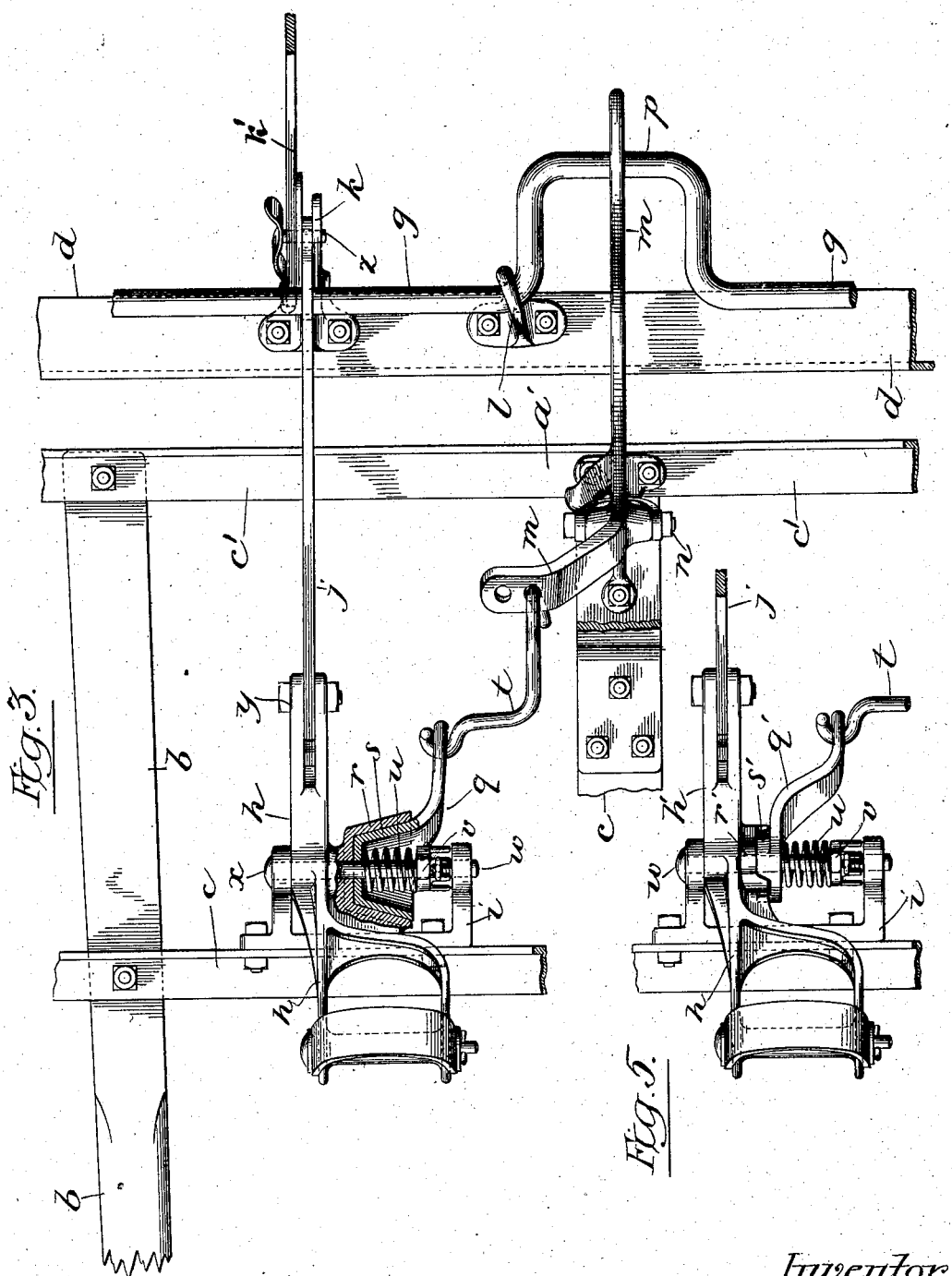

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

AUTOMATIC TRIP FOR HORSE HAY-RAKES.

SPECIFICATION forming part of Letters Patent No. 737,245, dated August 25, 1903.

Application filed September 24, 1902. Serial No. 124,610. (No model.)

*To all whom it may concern:*

Be it known that I, EDWARD A. JOHNSTON, a citizen of the United States, residing at Chicago, Cook county, Illinois, have invented certain new and useful Improvements in Automatic Trips for Horse Hay-Rakes; and I do hereby declare the following to be a full, clear, and exact description of the invention, such as will enable others skilled in the art to which it appertains to make and use the same.

The invention relates to wheeled horse hay-rakes, and especially those where the load is dumped by locking the rake-head temporarily to the wheels until the teeth are sufficiently elevated to discharge the accumulated hay, when the head is disengaged and the teeth gravitate back to their raking position. This type of rake is known as "draft-dumpers," and the temporary connection between the rake-head and the wheels is made by a rock-shaft extending along the head and carrying pawls at its opposite ends, which when thrown into engagement with the ratchets carried by and revolving with the wheels cause the head to make a partial rotation with the wheels. Heretofore the pawl-operating shaft has always been thrown into action by the driver through the intermediacy of a hand or foot lever; but the present invention contemplates the automatic tripping of this shaft; and it consists, broadly, in connecting the trip-lever which actuates the shaft with the rake-head in such a way that when the holding-lever is unrestrained the movement given to it by the natural tendency of the rake to dump itself will cause the lever to move the pawl-tripping lever sufficiently to actuate the pawl-operating shaft and throw the dumping-pawls into action. Immediately after this the trip-lever strikes a stop on the frame and comes to rest in a position to hold the dumping-pawls against accidental or premature disengagement with their ratchets; but by reason of the interposition of a yielding connection between the holding-lever and the trip-lever the former is allowed to continue to move with the rake-head during the completion of the dumping operation.

The invention is illustrated in the accompanying drawings, wherein—

Figure 1 is a sectional elevation of a rake, showing the teeth in raking position. Fig. 2 is a similar view with the teeth elevated to discharge the load. Fig. 3 is a plan view of the mechanism for actuating the pawl-operating shaft, showing my automatic tripping arrangement; and Figs. 4 and 5 are side and plan details of a modification of the tripping-lever and the foot-lever.

Referring to the views, $a$ denotes the wheels; $b$, the shaft; $c$, the frame, and $d$ the rake-head. All these parts, together with the ratchets $e$, the pawls $f$, and the pawl-operating shaft $g$, are of the usual construction and operate in a well-known manner.

The rake-head really constitutes the axle of the machine. It is free to rock, as in all machines of this type, and the teeth are held in raking position by means of a bell-crank lever $h$, which is pivoted to one of the cross-bars of the rake-frame in the arms of a bracket $i$ and has its rear arm connected by a strap or bar $j$ to the rake-head through the intermediacy of an upstanding post or bracket $k$, to which is also secured a hand-lever $k'$. There is nothing novel in this foot-lever and such of its connections as have already been described, and no further explanation thereof seems necessary, except, perhaps, to note that the three pivots of the lever—viz., $x$, $y$, and $z$—are so nearly in line when the rake-teeth are down that a very slight pressure of the driver's foot holds the teeth in raking position. The pivots are not actually in line, however, or so arranged that the connections form a lock when the teeth are in raking position, but are arranged so that when the reaction of the load carried by the teeth is brought on the connections the holding-lever will be operated, unless the driver has his foot on it. It is only necessary, therefore, for him to raise his foot, when the normal tendency of the rake to dump itself will without any further attention on his part operate the foot-lever and connections so as to trip the pawl-operating shaft and dump the rake in the manner more fully described later on. The rake may also be dumped manually by the hand-lever $k'$ instead of by this draft arrangement, if desired. The pawl-operating shaft $g$ is, as usual, journaled in bearings, as $l$, on the rake-head, and the immediate means for actuating it is a lever m, which is pivoted at n on the rake-frame and has an elongated slot o, through which the cranked portion p of the shaft passes. As thus far described there is no novelty in this particular connection except the construction of the trip-lever m, which is specially adapted for the purpose, and the invention resides more especially in such construction of the lever and the means now to be described for connecting it to the holding-lever h, whereby the improved mode of operation above described is introduced into the machine.

As will be understood by those acquainted with this class of machines, there is always a tendency for the rake to dump itself, owing to the pressure of the accumulated hay against the teeth, and it is necessary to hold the teeth in raking position, which is usually done by means of hand or foot levers. This tendency has not heretofore, so far as I am aware, been availed of for any useful purpose; but the present invention contemplates utilizing it to make the rake self-tripping. To this end the trip-lever is connected to the head in such a manner that as soon as the pressure of the foot is taken off the lever h and the head begins to rock under the resistance of the load the pawl-operating shaft is actuated by the trip-lever and the dumping-pawls are engaged with their ratchets. The trip-lever moves a short distance with the head; but immediately after the pawls are thrown into action it comes up against a stop and does not move in the further movement of the rake-head. The foot-lever h, however, and its connections j k with the head being rigid, must move with it, and the present invention contemplates the interposition of a yielding connection between the foot-lever and the pawl-tripping lever which permits the former and its connections to continue to move notwithstanding the trip-lever has stopped. To this end the foot-lever has an open-ended cone r, formed concentric with its axis, and a supplemental lever q is pivoted on the same axis and has a yielding connection with the foot-lever through the intermediacy of a similar reversed cone s, which is formed on its hub and is inclosed within the cone of the lever h. The other end of the supplemental lever is connected by a link t to the front end of the trip-lever m, and the reversed cone s on the hub of the lever, which has a frictional engagement only within the hollow of the cone r on the foot-lever h, makes a yielding connection with said lever, which is made regulable as to pressure by means of a spring u, that is adjustable by the nut v, screwing on the threaded pin w, which forms the pivot of the two levers. In Figs. 4 and 5 a modification of this connection between the two levers is shown, said modification consisting merely in providing the hub s' of the lever q' with notches having inclined edges, as best shown in Fig. 5, instead of making the hub in the form of a cone, as in Fig. 3. The construction of the lever h' is also modified to the extent of substituting for the hollow cone a hub r', having teeth with inclined edges, like those of the lever q'. These modifications are mere variations in constructional details, and the operation is precisely the same as that of the construction first described.

When the pressure of the driver's foot is removed from the lever h, permitting the dumping operation to start, as above described, the slight rocking movement of the rake-head turns the foot-lever upon its axis, and likewise the supplemental lever q, which is connected thereto, which movement is imparted to the trip-lever m, raising it to the tripping position. After the shaft g has been operated to throw the pawls f into engagement with the ratchets e by the raising of the trip-lever m the turning movement of the rake-head of course carries the shaft bodily with it, and the purpose of the slot o in the trip-lever is to permit this movement of the crank of the shaft. The trip-lever is held in the raised or tripping position during the dumping operation by the resistance offered by the friction-cones to the further movement of the foot-lever. In order that there may be no resistance to the passage of the crank p of the pawl-operating shaft in the slot o of the trip-lever, which resistance would tend prematurely to disengage the pawls f from the ratchets e, the trip-lever m is provided with a stop a', which contacts with the cross-piece $c^{21}$ of the rake-frame and limits the lever's further movement. When the rake-teeth are sufficiently elevated to make a clean discharge of the load, which is predetermined by the length of the slot o, a slight further movement of the rake-head causes the crank part of the shaft g to engage the forward extremity of the slot in the lever m and rocks the shaft backward, so as to release the dumping-pawls. Heretofore the trip-lever has been allowed to drop as soon as the dumping-pawls are released; but in the present arrangement it is held in its raised position until the rake-head starts to return. In order to allow for the backward movement of the crank in the shaft g to release the pawls, the forward end of the slot in the trip-lever is enlarged, as shown at b' in Figs. 1 and 2, and the two positions of the trip-shaft and its crank before and after tripping are indicated by full and dotted lines in Fig. 2. The construction being as above described, when the foot-lever is released the pressure of the accumulated hay causes the rake-head to have a slight rocking movement forward, which, however, is insufficient to elevate the teeth far enough to dump the load or to throw the pawl-actuating shaft g into operation by the means heretofore employed; but by the above-described construction of the shaft-tripping lever m and the interposition of the yielding connection between the foot-lever and this tripping-lever this natural tendency of the rake to dump itself is first imparted to the tripping-lever, so as to throw the pawls into engagement with their ratchets, and, second, the continued movement of the foot-lever and its connections is permitted independently of the trip-lever during the completion of the dumping operation. So far as I am aware any arrangement for effecting this automatic tripping of the pawl-operating shaft is entirely new, and I therefore do not contemplate being limited to the construction herein illustrated and described, but desire and intend my claims to have a broad construction commensurate with the radical novelty of the invention, so as to protect any and all modifications in the construction that do not of themselves amount to a departure from the spirit and scope of the invention.

Having thus described my invention, what I claim is—

1. In a wheeled hay-rake, the combination of the head, the pawl-operating shaft, the trip-lever, and a connection between the head and lever whereby the natural tendency of the rake to dump itself will start the lever and raise it sufficiently to rock the shaft and throw the pawls into engagement with the ratchet-wheels.

2. In a wheeled hay-rake, the combination with the rake-head, the lever for holding the rake-teeth down, the pawls and ratchets, their operating-shaft, and the pawl-tripping lever, of a yielding connection between the holding-lever and the trip-lever, whereby the movement of the holding-lever is permitted during the completion of the dumping operation without moving the trip-lever.

3. In a wheeled hay-rake, the combination with the rake-head, the dumping-pawls and ratchets, and their operating-shaft, of a trip-lever pivoted on the rake-frame and having a stop to limit its forward movement, and a connection between the lever and pawl-operating shaft, whereby the initial movement of the rake-head operates the trip to throw the dumping-pawls into action, and the further movement of the head to complete the dumping is independent of the trip-lever.

4. In a wheeled hay-rake, the combination with the rake-head, the dumping-pawls and ratchets, and their operating-shaft, of a trip-lever pivoted on the rake-frame and slotted for the passage therethrough of the pawl-operating shaft, and a stop to limit the movement of said trip-lever, whereby the lever is operated to throw the pawls into action during the initial movement of the head, but stops and remains stationary during the completion of the dumping action.

5. In a wheeled hay-rake, the combination with the rake-head, the lever for holding the rake-teeth down and its connections with the head, of the dumping-pawls and ratchets, their operating-shaft, and a tripping-lever having a yielding connection with the holding-lever, whereby the trip-lever is automatically operated to throw the pawls into action, and the movement of the holding-lever during the completion of the dumping operation is permitted without moving the trip-lever.

6. In a wheeled hay-rake, the combination with the rake-head, of the dumping-pawls and ratchets, the pawl-operating shaft, a trip-lever having a limited movement to throw the pawls into action, and a stop to limit the movement of the lever and hold it during the completion of the dumping operation, whereby the premature disengagement of the pawls is prevented.

7. In a wheeled hay-rake, the combination with the rake-head, the pawls and ratchets, their operating-shaft, and the lever for holding the rake-teeth down, of a trip-lever pivoted on the frame and having a slot through which the pawl-operating shaft passes, a lever pivoted concentrically with the holding-lever and link connected with the trip-lever, and a yielding frictional connection between said levers, whereby when the pawls are thrown into engagement with their ratchets by the trip-lever, the holding-lever is permitted to move with the rake-head independently of the trip-lever.

8. In a wheeled hay-rake, the combination with the rake-head, the pawls and ratchets, their operating-shaft, and the lever for holding the rake-teeth down, of a trip-lever pivoted on the frame and having a slot through which the pawl-operating shaft passes, a lever $q$ pivoted concentrically with the holding-lever and having a hub with frictional surfaces engaging corresponding surfaces on the holding-lever, an adjustable spring pressing said surfaces together, a link connection between the lever $q$ and the trip-lever, and a link connection between the holding-lever and the rake-head.

9. In a wheeled hay-rake, the combination with the cranked pawl-operating shaft, of a pivoted trip-lever having a slot through which the crank of the shaft passes, and a projection on the lever to engage the frame and limit the lever's upward movement, the forward end of the slot in the lever being enlarged to permit the movement of the shaft-crank required to disengage the pawls from their ratchets.

10. In a wheeled hay-rake, the combination of the pawl-operating shaft having the crank $p$, the pivoted trip-lever having the slot $o$ through which the crank passes, and the projection $a'$ on the lever to engage the frame and limit the lever's upward movement, and a slot in the trip-lever having the enlargement $b'$ at its forward end so as to allow of the necessary movement of the crank $p$ to disengage the pawls from their ratchets and allow the rake-teeth to return to raking position.

In testimony whereof I affix my signature in presence of two witnesses.

EDWARD A. JOHNSTON.

Witnesses:
CHAS. N. CHAMBERS,
W. M. TWOMBLY.